United States Patent
Akado et al.

(10) Patent No.: US 8,947,727 B2
(45) Date of Patent: Feb. 3, 2015

(54) IMAGE PROCESSING SYSTEM, IMAGE PROCESSING METHOD THEREFOR, AND STORAGE MEDIUM

(75) Inventors: Yukinobu Akado, Kawasaki (JP); Hitoshi Onoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 12/633,173

(22) Filed: Dec. 8, 2009

(65) Prior Publication Data

US 2010/0157337 A1 Jun. 24, 2010

(30) Foreign Application Priority Data

Dec. 22, 2008 (JP) .................................. 2008-326582
Nov. 9, 2009 (JP) .................................. 2009-256547

(51) Int. Cl.

| G06F 3/12 | (2006.01) |
| H04N 1/40 | (2006.01) |
| G03F 3/08 | (2006.01) |
| H04N 1/46 | (2006.01) |
| H04N 1/60 | (2006.01) |

(52) U.S. Cl.
CPC .................................. H04N 1/6033 (2013.01)
USPC ............ 358/1.9; 358/448; 358/521; 358/518; 358/500; 101/147; 101/211

(58) Field of Classification Search
CPC ...................................................... G06K 9/00
USPC ......... 358/1.9, 448, 518, 3.28, 296, 504, 534; 283/113, 114; 382/167
See application file for complete search history.

(56) References Cited

U.S. PATENT DOCUMENTS

| 5,687,000 | A | * | 11/1997 | Nakaoka ........................ 358/296 |
| 5,696,889 | A | * | 12/1997 | Morikawa ...................... 358/1.9 |
| 6,999,200 | B2 | * | 2/2006 | Shiraishi ........................ 358/1.9 |
| 7,006,691 | B2 | * | 2/2006 | Muramoto ..................... 382/167 |
| 7,209,261 | B2 | * | 4/2007 | Krueger et al. ................ 358/1.9 |
| 7,345,798 | B2 | * | 3/2008 | Kondo ........................... 358/523 |
| 7,626,728 | B2 | | 12/2009 | Itagaki et al. |
| 7,710,610 | B2 | * | 5/2010 | Katagiri et al. .............. 358/3.28 |
| 7,755,795 | B2 | * | 7/2010 | Shimada ........................ 358/1.9 |
| 7,898,690 | B2 | * | 3/2011 | Matsuzawa .................... 358/1.9 |
| 8,023,156 | B2 | * | 9/2011 | Mestha et al. ................ 358/3.23 |
| 2005/0146737 | A1 | * | 7/2005 | Ono ................................ 358/1.9 |
| 2009/0290180 | A1 | | 11/2009 | Onoda |

FOREIGN PATENT DOCUMENTS

| JP | 2003-266642 A | 9/2003 |
| JP | 2006-209407 | 8/2006 |
| JP | 2007-181142 A | 7/2007 |

* cited by examiner

*Primary Examiner* — Akwasi M Sarpong
(74) *Attorney, Agent, or Firm* — Fitzpatrick, Cella, Harper & Scinto (57) ABSTRACT

An image processing system comprising: a color conversion unit configured to perform color conversion from color data in a first color space into color data in a second color space by using a color profile; a correction unit configured to perform correction for the color data in the second color space by using correction data; a printing unit configured to print on a printing medium in accordance with the color data in the second color space that is corrected by the correction unit; a first changing unit configured to change the color profile; a second changing unit configured to change the correction data; and a selection unit configured to select, based on a color measurement result of a color chart for correcting a color of an image printed on the printing medium, one of processes including change of the color profile and change of the correction data.

16 Claims, 10 Drawing Sheets

| R | G | B | C | M | Y | K |
|---|---|---|---|---|---|---|
| 0 | 0 | 0 | 20 | 5 | 35 | 255 |
| 0 | 0 | 17 | 43 | 17 | 23 | 192 |
| 0 | 0 | 34 | 56 | 34 | 2 | 125 |
| ⋮ | | | ⋮ | | | |
| 255 | 255 | 255 | 0 | 0 | 0 | 0 |

FIG. 19

IMAGE PROCESSING SYSTEM, IMAGE PROCESSING METHOD THEREFOR, AND STORAGE MEDIUM

BACKGROUND OF THE INVENTION

1. Field of the Invention

The present invention relates to an image processing system, image processing method therefor, and storage medium.

2. Description of the Related Art

A printing apparatus capable of color printing (e.g., color printer) receives, for example, RGB multi-valued data as input image data, internally executes color conversion processing from R, G, and B into C, M, Y, and K, and prints with C, M, Y, and K color materials (inks or toners).

Most printing apparatuses of this type have a calibration function to suppress variations of output colors owing to an individual difference of the output apparatus, environmental dependence, aging, and the like. In calibration, a calibration color chart is printed and its color is measured. At this time, if a color chart formed from primary colors which are not mixtures of ink colors is used, the number of printed patches is relatively small. Calibration using a color chart formed from primary colors consumes a small amount of consumables (e.g., sheets and inks), and takes a short time for printing and measurement. This calibration is therefore suitable when executed frequently. However, the main purpose of the calibration using a color chart formed from primary colors is to adjust the density and lightness of each ink, and the degree of freedom of adjustment is low.

Variation factors of the output color include not only variations of the printing apparatus itself, but also the difference between lots of ink for use and that between lots of printing media to be output. In many cases, a difference in tint arising from the difference between lots of ink or printing media cannot be corrected by the above-mentioned correction of primary colors, that is, calibration using a 1D-LUT. For example, when the tint of a cyan (C) ink changes to be bluish due to the lot difference, it cannot be corrected only using a cyan 1D-LUT. In this case, the mixing balance between cyan (C), magenta (M), and yellow (Y) inks needs to be adjusted to correct the tint using a 3D-LUT. When correcting the tint based on the 3D-LUT, a color profile needs to be generated and changed. Generating and changing a color profile will be expressed as generation of a color profile at once.

To generate a color profile, it is necessary to print many mixed color patches by combining a plurality of ink colors variously as a color chart for generating a color profile, and measure the color of the chart. Printing a color chart for a color profile consumes a large amount of consumables and takes a long time for printing and measurement.

Thus, it is not preferable to generate a color profile frequently. However, when a color profile is generated, a combination of output colors can be freely adjusted, so the degree of freedom of adjustment is high.

There has conventionally been known a technique of determining whether to execute calibration based on the allowance of the calibration precision set for a print job, and selectively executing calibration using a 1D-LUT or change of a profile by multi-dimensional correction (see Japanese Patent Laid-Open No. 2006-209407).

Correction of a color profile (correction by a multi-dimensional LUT) is effective to cope with all possible variations, that is, variations of the output apparatus, variations of ink, and variations of printing media and reproduce a stable tint. However, the color profile requires a large consumption amount of consumables and a long working time, as described above, puts a heavy burden on the user, and is not practical in operation.

To the contrary, calibration (correction by a 1D-LUT) can cope with only frequent variations, that is, variations of the output apparatus, but requires only a small consumption amount of consumables and a short working time and is practical in operation. However, the calibration cannot deal with variations of ink and printing media, as described above, and printing may be done with an improper tint.

According to the method disclosed in Japanese Patent Laid-Open No. 2006-209407, correction by a 1D-LUT and that by a multi-dimensional LUT are switched and executed. However, the switching is fixed in advance by the system or needs to be determined by the user. When the user is to make a determination, he has to select an appropriate correction method after analyzing a variation factor. This puts a heavy burden on the user.

SUMMARY OF THE INVENTION

The present invention provides a technique capable of properly correcting color reproduction characteristics in a printing apparatus.

According to a first aspect of the present invention there is provided an image processing system comprising: a color conversion unit configured to perform color conversion from color data in a first color space into color data in a second color space by using a color profile; a correction unit configured to perform correction for the color data in the second color space by using correction data; a printing unit configured to print on a printing medium in accordance with the color data in the second color space that is corrected by the correction unit; a first changing unit configured to change the color profile used for the color conversion by the color conversion unit; a second changing unit configured to change the correction data used for the correction by the correction unit; and a selection unit configured to select, based on a color measurement result of a color chart for correcting a color of an image printed on the printing medium by the printing unit, one of processes including change of the color profile by the first changing unit and change of the correction data by the second changing unit.

According to a second aspect of the present invention there is provided an image processing method in an image processing system, comprising the steps of: performing color conversion from color data in a first color space into color data in a second color space by using a color profile; performing correction for the color data in the second color space by using correction data; printing on a printing medium in accordance with the color data in the second color space that is corrected in the step of performing correction; changing the color profile used for the color conversion in the step of performing color conversion; changing the correction data used for the correction in the step of performing correction; and selecting, based on a color measurement result of a color chart for correcting a color of an image printed on the printing medium in the step of printing, one of processes including change of the color profile in the step of changing the color profile and change of the correction data in the step of changing the correction data.

Further features of the present invention will be apparent from the following description of exemplary embodiments with reference to the attached drawings.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
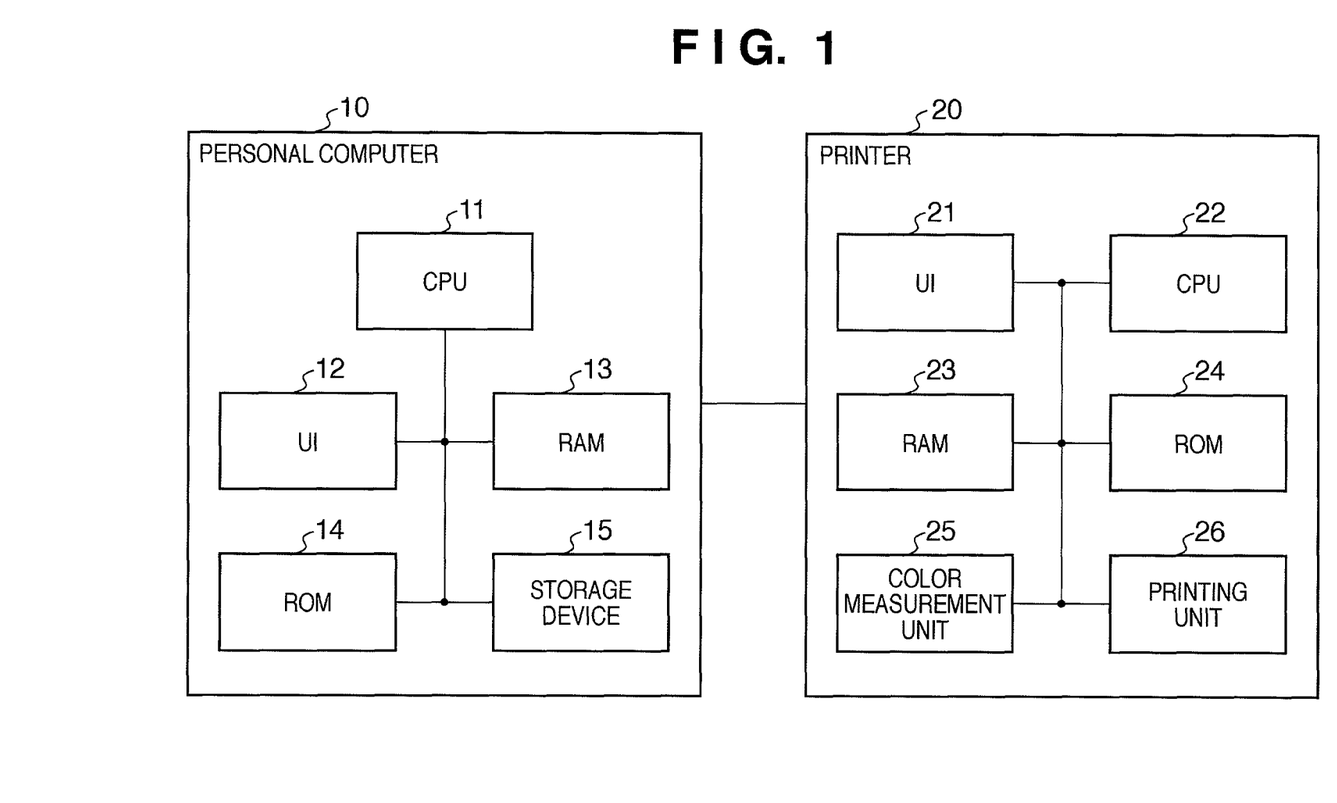
FIG. 1 is a block diagram exemplifying the overall configuration of an image processing system according to an embodiment of the present invention.

FIG. 1 is a block diagram exemplifying the overall configuration of an image processing system according to the first embodiment of the present invention. The image processing system is connected to a personal computer 10 (to be simply referred to as a "PC 10") and a printer 20 via a communication means formed from a LAN (Local Area Network), USB (Universal Serial Bus), or the like. The whole configuration shown in FIG. 1 is merely an example. For example, a plurality of PCs 10 and a plurality of printers 20 may be arranged, or other apparatuses may be connected to the communication means.

The PC 10 functions as an image processing apparatus manipulated by the user. The PC 10 includes a CPU 11, UI (User Interface) 12, RAM (Random Access Memory) 13, ROM (Read Only Memory) 14, and storage device 15. The UI 12 includes an input unit having a function of inputting an instruction from the user into the apparatus via a keyboard, mouse, or the like, and an output unit having a function of displaying various kinds of information to the user on a display or the like. The storage device 15 is formed from, for example, a hard disk and stores a variety of programs (e.g., applications and OS) and the like. The CPU 11 comprehensively controls processes in the PC 10 according to various programs stored in the storage device 15 by using the RAM 13 as a work area. In printing with the printer 20, the CPU 11 executes image processing (e.g., color conversion processing) in accordance with various programs (e.g., printer driver).

The printer 20 is, for example, an inkjet printer and functions as a printing apparatus which prints. The printer 20 includes a UI 21, CPU 22, RAM 23, ROM 24, color measurement unit 25, and printing unit 26. The UI 21 includes an input unit having a function of inputting an instruction from the user into the apparatus via a touch panel, button, or the like, and an output unit having a function of displaying various kinds of information to the user on a display or the like. The CPU 22 comprehensively controls processes in the printer 20 according to various programs stored in the ROM 24 by using the RAM 23 as a work area. The color measurement unit 25 is a colorimeter which reads a color measurement image (e.g., patch) formed on a printing medium to measure the color. The color measurement unit 25 may be a densitometer which measures the density.

The printing unit 26 prints by forming an image on a printing medium such as paper using, for example, four, C, M, Y, and K color printing materials (inks). The first embodiment will exemplify a case in which the printer 20 incorporates the color measurement unit 25. However, the present invention is not limited to this, and the color measurement unit 25 may be arranged outside the printer 20. Also, the first embodiment will exemplify a case in which the printing unit 26 adopts an inkjet method of printing with ink. However, the present invention is not limited to this, and the printing unit 26 may comply with an electrophotographic method using toner as a color material.

For descriptive convenience of the image processing system according to the first embodiment, the sequence of calibration processing will be explained briefly. First, the user creates a document, image, or the like using various applications in the PC 10. If the user instructs the PC 10 to print the image or the like, a print application (e.g., printer driver) in the PC 10 executes predetermined image processing and transmits print data based on the image or the like to the printer 20. The printer 20 prints based on the print data.

For example, the print data transmitted to the printer 20 is assumed to be a predetermined measurement color chart image (e.g., calibration patch data). In this case, the printer 20 causes the printing unit 26 to print based on the data and the color measurement unit 25 to measure the measurement values of the printed patches, for example, L*a*b* values, XYZ values, or density values. The printer 20 transmits the measurement results as measurement data (measurement values) to the PC 10 (e.g., image processing program). The first embodiment will exemplify a case in which the image processing program is installed in the PC 10, but the image processing program may be installed in the printer 20.

The PC 10 determines whether to perform calibration based on the measurement data or generate a new color profile (new profile). Details of this determination will be described later. In accordance with the determination result, calibration processing and profile generation processing are done. The whole configuration of the image processing system according to the first embodiment has been explained.

Figure 2:
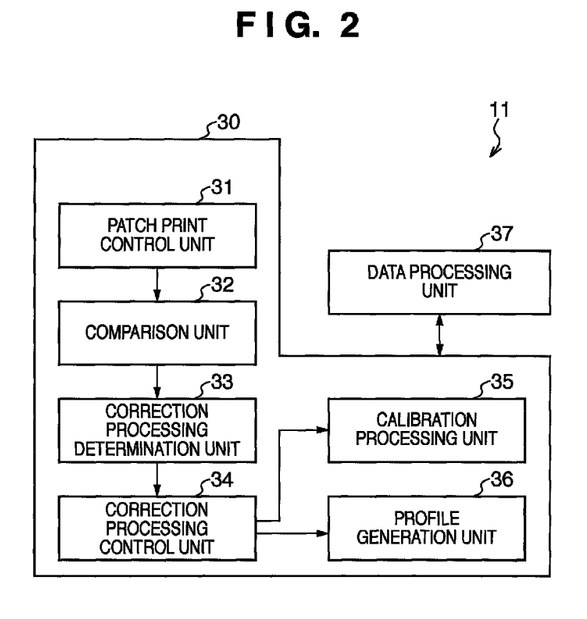
FIG. 2 is a block diagram exemplifying a functional arrangement implemented by a CPU 11 in a PC 10 shown in FIG. 1.

A functional arrangement implemented by the CPU 11 of the PC 10 will be exemplified with reference to FIG. 2. The functional arrangement within a frame denoted by reference numeral 30 shown in FIG. 2 is obtained by reading out the image processing program from the ROM 14 or storage device 15 and executing it by the CPU 11 using the RAM 13 as a work area.

As the functional arrangement, the CPU 11 includes a patch print control unit 31, comparison unit 32, correction processing determination unit 33, correction processing control unit 34, calibration processing unit 35, profile generation unit 36, and data processing unit 37.

The data processing unit 37 executes output data processing (e.g., color conversion processing) for data to be printed using a look-up table (LUT) or the like, thereby generating print data. The output data processing includes color conversion processing (color matching processing and color separation processing), output γ correction processing, and halftone processing. Note that the printer 20 may perform all or some of these output data processes.

Figure 4:
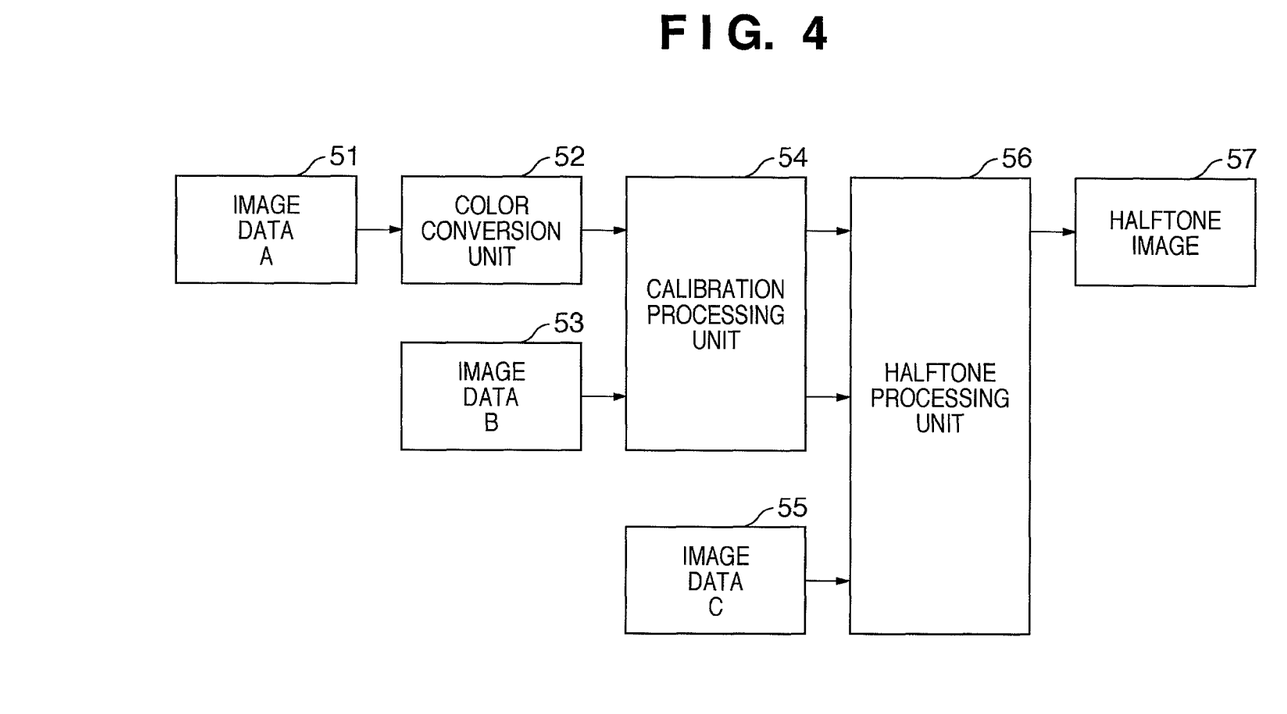
FIG. 4 is a block diagram exemplifying processing executed by a data processing unit 37 shown in FIG. 3.

FIG. 4 is a conceptual view showing processing executed by the data processing unit 37 in the first embodiment. Normal print processing starts from image data A 51. The data processing unit 37 causes a color conversion unit 52 to execute color conversion processing for the image data A 51 using a three-dimensional look-up table (3D-LUT). Accordingly, RGB (first color space) color data is converted into CMYK (second color space) color data for printing.

Then, the data processing unit 37 causes a calibration processing unit 54 to perform calibration processing based on a 1D-LUT for each of C, M, Y, and K data. For example, the calibration processing unit 54 executes correction processing (e.g., output γ correction) complying with the characteristics of the printing unit 26. After this processing, the data processing unit 37 causes a halftone processing unit 56 to execute dithering, halftone dot processing, or error diffusion processing, and converts 8-bit (256 tone levels of 0 to 255) data for each of C, M, Y, and K into binary (0 or 1) data for each of C, M, Y, and K, thereby generating a halftone image 57.

In some cases, the data processing unit 37 performs only calibration processing and subsequent ones for specific image data (to be referred to as image data B 53: to be described later). In this case, the data processing unit 37 causes the calibration processing unit 54 and halftone processing unit 56 to execute the above-described processes for the image data B 53, generating the halftone image 57. In these processes, color conversion processing by the color conversion unit 52 is not done. For another specific image data (to be referred to as image data C 55), the data processing unit 37 executes only processing by the halftone processing unit 56 without performing even calibration processing, thereby generating the halftone image 57. The processes executed by the data processing unit 37 have been described.

Figure 5:
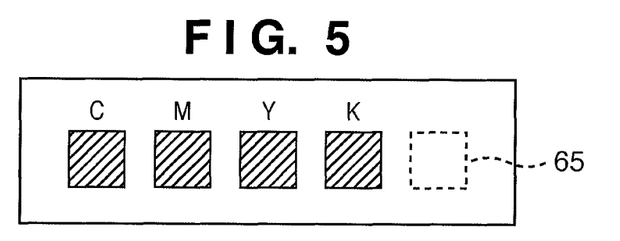
FIG. 5 is a view exemplifying a determination chart.

Referring back to FIG. 2, the patch print control unit 31 controls execution of printing a determination chart including a plurality of determination patches. The determination chart is used when the printer 20 determines whether to execute calibration or generation of a profile. As shown in FIG. 5, the determination chart is made up of four determination patches for C=50%, M=50%, Y=50%, and K=50%. The patch print control unit 31 transmits, to the printer 20, print data for printing the chart.

In the embodiment, an image printed for each color will be called a patch, and an image formed from a plurality of patches will be called a chart or color chart.

In output data processing when printing a determination chart, calibration processing and halftone processing are executed, like the image data B 53 shown in FIG. 4. The determination patch may be made up of a plurality of patches corresponding to a plurality of tone values, for example, four tone values of 25%, 50%, 75%, and 100% for each color. The determination chart is transmitted the printer 20 and printed. Then, the color measurement unit 25 in the printer 20 measures the determination chart and sends the measurement result (color measurement result) to the comparison unit 32. At this time, a blank paper region (unprinted region) 65 shown in FIG. 5 is also measured.

The comparison unit 32 compares the measurement value of each patch with a target value stored in advance. When the measurement value of the color measurement unit 25 is a density, the comparison unit 32 compares a measured density value with a target density value. When the measurement value of the color measurement unit 25 is a color measurement value such as an $L^*a^*b^*$ value, the comparison unit 32 calculates the color difference $\Delta E$ between a color measurement value and a target value. The comparison is done for each patch. The target value is a target color reproduction characteristic of the printer 20 and held in advance in, for example, the image processing program. A target tone value may be externally read to update the target value. The color reproduction characteristic of the printer immediately after executing previous calibration may be stored and used as a target value.

Based on the comparison result of the comparison unit 32, the correction processing determination unit 33 determines whether correction is unnecessary, whether to perform calibration, whether to generate a profile, and the like. Although detailed contents will be described later, if the correction processing determination unit 33 determines to perform calibration, it further determines which of calibration and generation of a profile is to be executed.

Based on the determination result of the correction processing determination unit 33, the correction processing control unit 34 selectively controls execution of calibration processing and profile generation processing. More specifically, the correction processing control unit 34 selects one of processes including calibration processing, profile generation processing, and suspension of processing, and controls execution of processing based on the selection. Under this control, calibration processing by the calibration processing unit 35 or profile generation processing by the profile generation unit 36 is executed.

The profile generation unit 36 functions as the first changing unit and generates a profile for use in color matching by the color conversion unit 52. The calibration processing unit 35 functions as the second changing unit and executes calibration processing, that is, updates a 1D-LUT (correction data) used by the calibration processing unit 54.

Figure 3:
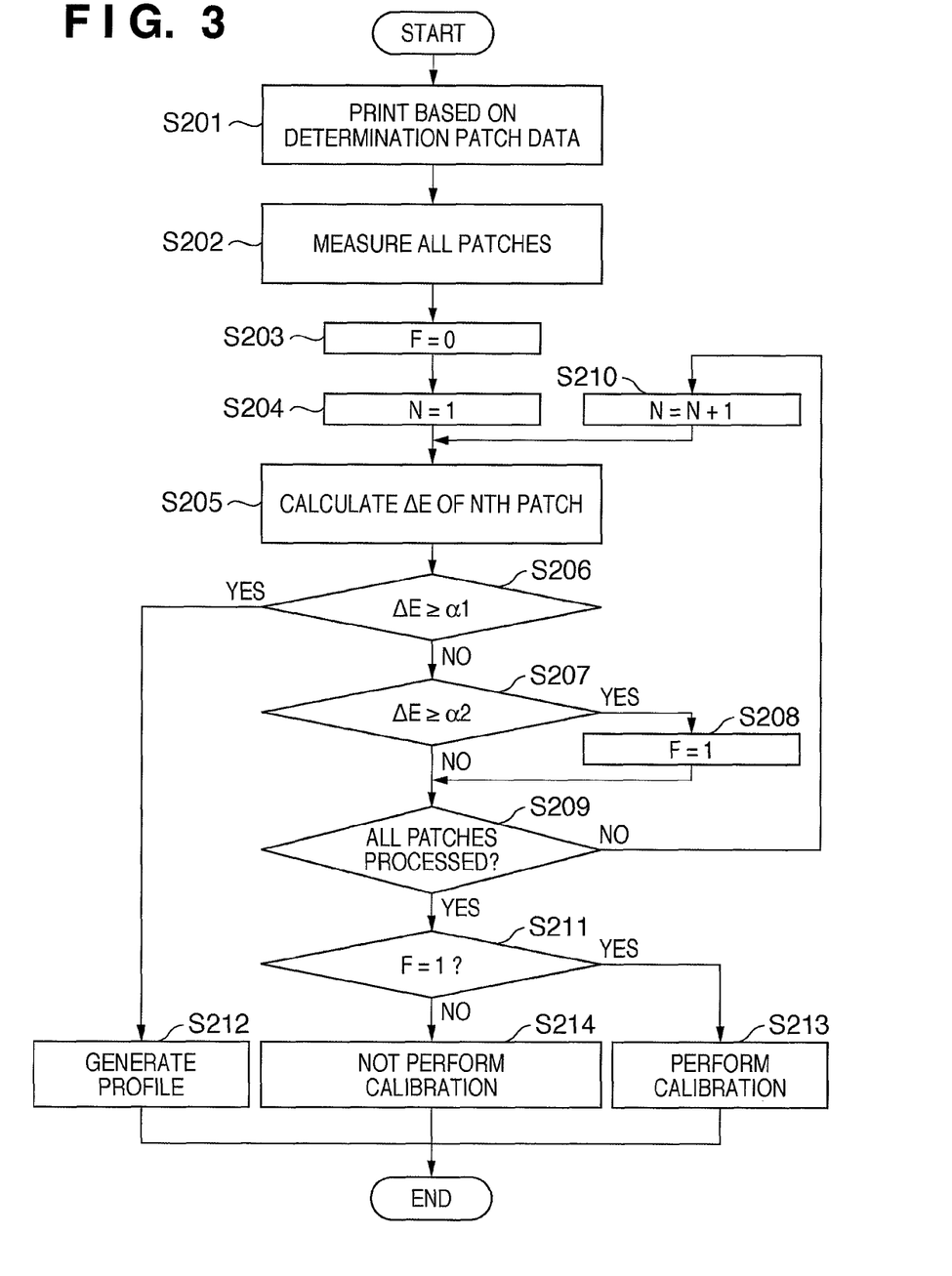
FIG. 3 is a flowchart exemplifying the sequence of an operation in the image processing system shown in FIG. 1.

An operation in the image processing system shown in FIG. 1 will be exemplified with reference to FIG. 3. An operation when performing calibration processing or profile generation processing will be exemplified here. For descriptive convenience, processing after transmitting print data (determination patch data) from the PC 10 to the printer 20 will be explained.

The printer 20 causes the printing unit 26 to print a color chart based on the determination patch data (S201). Note that the determination patch data is sent from the image processing program of the PC 10 to the printer 20.

Subsequently, the printer 20 causes the color measurement unit 25 to read the printed determination patch image, acquiring the measurement value (S202). The measurement value is a density or a color measurement value such as an $L^*a^*b^*$ value. The printer 20 sends the measurement value to the PC 10. Upon receiving the measurement data, the PC 10 causes the comparison unit 32 to compare the tone value of the color measurement data measured in S202 with a target tone value (S203 to S211).

After the start of comparison processing, the comparison unit 32 first sets "0 (no calibration)" in a calibration determination flag F representing whether to execute calibration (S203). Then, the comparison unit 32 sets "1" in a counter N representing the patch number (S204). The comparison unit 32 calculates the difference between the measurement value of a patch corresponding to the patch number N (1 at the beginning) and its target value (S205). The comparison unit 32 calculates the absolute value of the density difference when the measurement value is a density, and the color difference $\Delta E$ when it is a color measurement value such as an $L^*a^*b^*$ value. It is determined whether the calculated color difference $\Delta E$ is equal to or larger than a predetermined threshold $\alpha 1$ (first threshold) (S206). For example, when the threshold $\alpha 1$ is 3.0 and the color difference of the patch is 3.5, the color difference $\Delta E$ is larger than the threshold $\alpha 1$. In this case, the correction processing determination unit 33 determines that the state of ink, printing medium, or printer has greatly changed, and determines that a profile needs to be generated.

If it is determined that the color difference $\Delta E$ is equal to or larger than the threshold $\alpha 1$ (YES in S206), a profile needs to be generated. Thus, the PC 10 causes the profile generation unit 36 to perform profile generation processing to be described later (S212). Thereafter, the process ends.

If it is determined that the color difference $\Delta E$ is smaller than the threshold $\alpha 1$ (NO in S206), the PC 10 causes the comparison unit 32 to compare the calculated difference $\Delta E$ with the second threshold $\alpha 2$ (second threshold). The threshold $\alpha 2$ is set to a value smaller than the threshold $\alpha 1$, for example, to 2.0. If it is determined that the color difference $\Delta E$ is equal to or larger than the threshold $\alpha 2$ (YES in S207), the PC 10 sets "1 (calibration is necessary)" in the calibration determination flag F (S208). The PC 10 then checks whether all the patches have been processed. If the PC 10 determines that an unchecked patch remains (NO in S209), it increments by one the counter N representing the patch number (S210), and returns again to the processing of S205 in order to process the next patch. If it is determined that the color difference $\Delta E$ is smaller than the threshold $\alpha 2$ (NO in S207), the PC 10 checks whether all the patches have been processed. If the PC 10 determines that an unchecked patch remains (NO in S209), it increments the counter N by one (S210), and returns again to the processing of S205.

Patches to be processed may include the blank paper region 65 represented by a rectangle of a dotted line in FIG. 5. In this case, the color difference between the measurement value and target value of the blank paper region 65 is calculated and compared with a predetermined threshold. As a result, even variations of printing media can also be added to decision-making information. The above-mentioned thresholds $\alpha 1$ and $\alpha 2$ may not be fixed values but set to different values for respective patches. In addition to setting a threshold optimal for each color, a threshold may be set for, for example, each tone level when patches are formed at many tone levels. For the blank paper region 65, it is possible to set a dedicated threshold appropriate for determining variations such as the lot difference or deterioration of printing media.

If the PC 10 determines in S209 that all the patches have been processed (YES in S209), it checks whether the value of the calibration determination flag F is "1 (calibration is necessary)". If the PC 10 determines that "1" is set (YES in S211), the color differences of one or more patches are equal to or larger than the threshold, so calibration processing to be described later is executed (S213). If the PC 10 determines that the value of the calibration determination flag F is "0" (NO in S211), the color differences of all the patches are smaller than the threshold $\alpha 2$, so the PC 10 determines that the state of the printer 20 has not changed. In this case, the PC 10 causes the correction processing control unit 34 to suspend execution of calibration processing (S214). The PC 10 causes the UI 12 to display a message to the user that no calibration is necessary. Thereafter, the process ends.

The calibration processing in S213 of FIG. 3 will be described. The calibration processing unit 35 executes this processing when it is determined that calibration processing needs to be executed (the value of the calibration determination flag F is "1").

Figure 6:
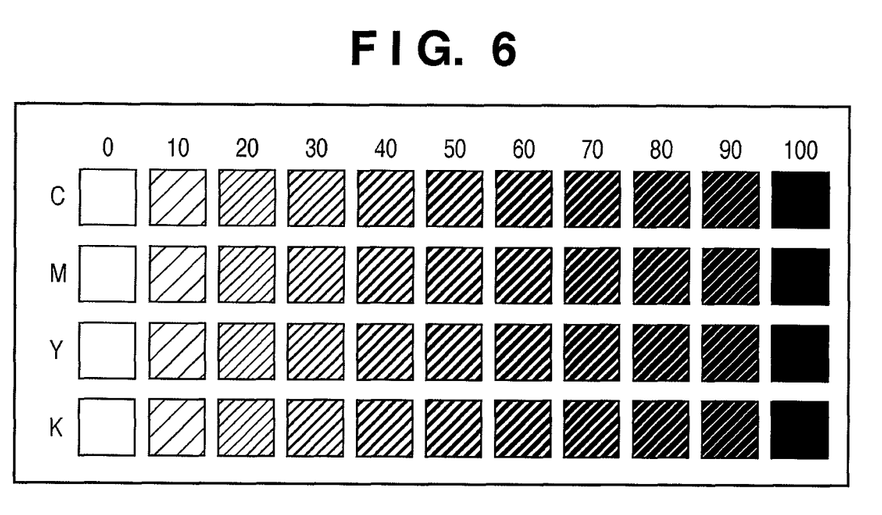
FIG. 6 is a view exemplifying a calibration chart.

In calibration processing, the printer 20 prints, for example, a calibration chart as shown in FIG. 6. In this chart, patches whose density is increased every 10% from 0% to 100% are arranged for each of C, M, Y, and K inks. When printing the calibration chart, the processing described for the image data C 55 in FIG. 4 is performed. More specifically, printing is done without performing calibration processing. Hence, a chart reflecting original characteristics before correcting the printer is printed.

The printer 20 causes the color measurement unit 25 to measure the printed calibration chart, acquiring the measurement results of all the patches. Based on the results, the printer 20 generates a correction table (1D-LUT) for each ink color.

Figure 7:
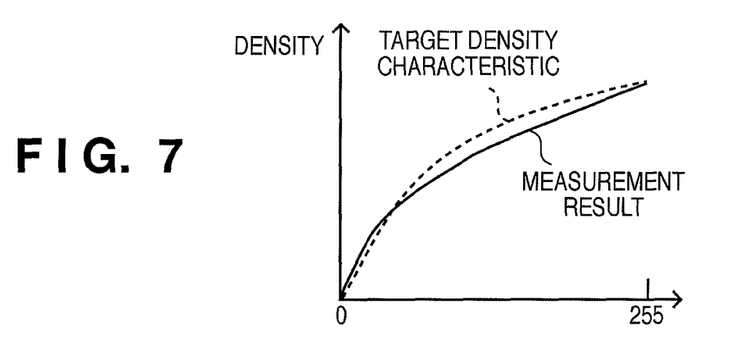
FIG. 7 is a graph exemplifying an outline of generating a correction table.
Figure 8:
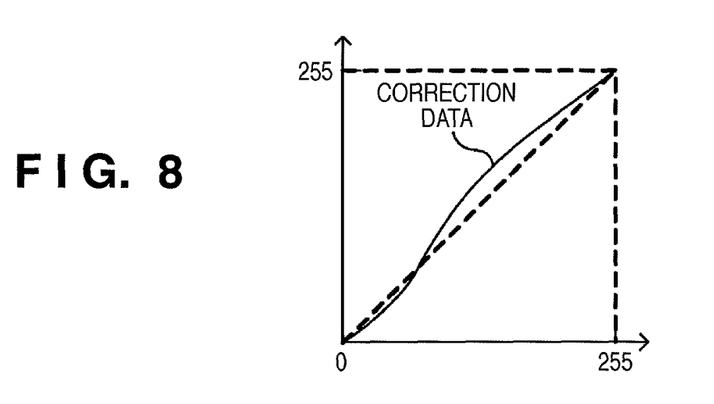
FIG. 8 is a graph exemplifying the correction table.

An outline of generating the correction table will be explained with reference to FIGS. 7 and 8. The abscissa in FIG. 7 represents an input tone value of 0 to 255, which corresponds to an ink amount of 0% to 100% for calibration patch data before printing. The ordinate in FIG. 7 represents density. Data of 0% to 100% before printing and density values obtained from the measurement results of printed patches are plotted, obtaining a measurement result indicated by a solid line in FIG. 7.

In contrast, a broken line indicates a target density characteristic, which is an ideal density characteristic in the printer 20. By comparing these two data, the printer 20 generates a correction table shown in FIG. 8 that makes the printer characteristic close to the target density characteristic. This comparison is executed for the respective C, M, Y, and K ink colors, generating four correction tables. The generation of correction tables is then completed.

In subsequent printing, the calibration processing unit 54 of the data processing unit 37 uses these correction tables. A printing result in which the tint is corrected to be close to the target density characteristic can be attained. In the above description, the density value is used as a measurement value. Alternatively, lightness data $L^*$ may be used to perform the same calculation and generate a correction table.

The profile generation processing in S212 of FIG. 3 will be explained with reference to FIGS. 9 to 13. The profile generation unit 36 executes this processing when it is determined that profile generation processing needs to be executed (the color difference $\Delta E$ is equal to or larger than the threshold $\alpha 1$). Generation of a color profile using a 3D-LUT whose input data is RGB data and output data is CMYK data will be exemplified.

Figure 9:
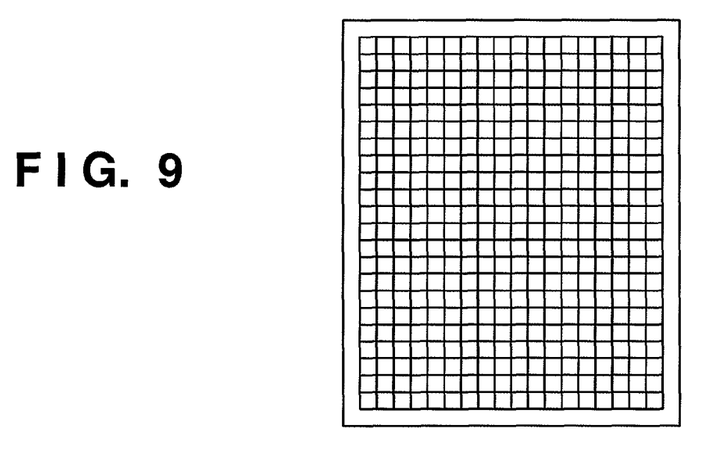
FIG. 9 is a view exemplifying a profile generation chart.

FIG. 9 exemplifies a profile generation chart. This chart is formed from 3,072 (512×6) patches. More specifically, patches are arranged in this chart at eight tone values for each of C, M, and Y colors. Six K values (0%, 10%, 20%, 40%, 80%, and 100%) are assigned to each tone value of the patch. All the combinations result in 3,072 (512×6) patches. When printing the profile generation chart, the processing described for the image data C 55 in FIG. 4 is performed.

Figure 10:
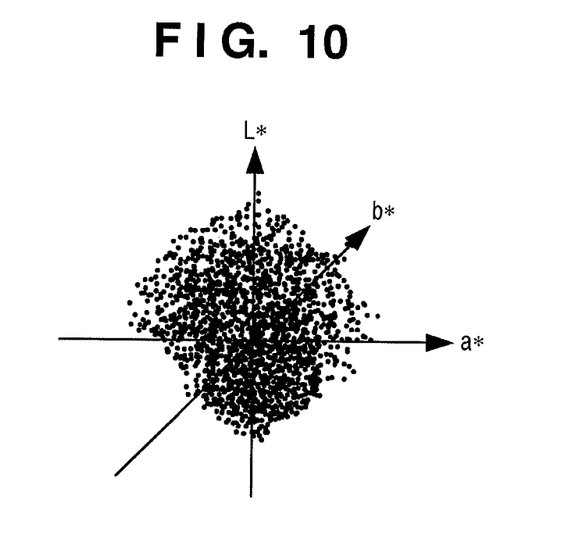
FIG. 10 is a graph exemplifying a distribution in the color space when measuring the color of the profile generation chart.
Figure 11:
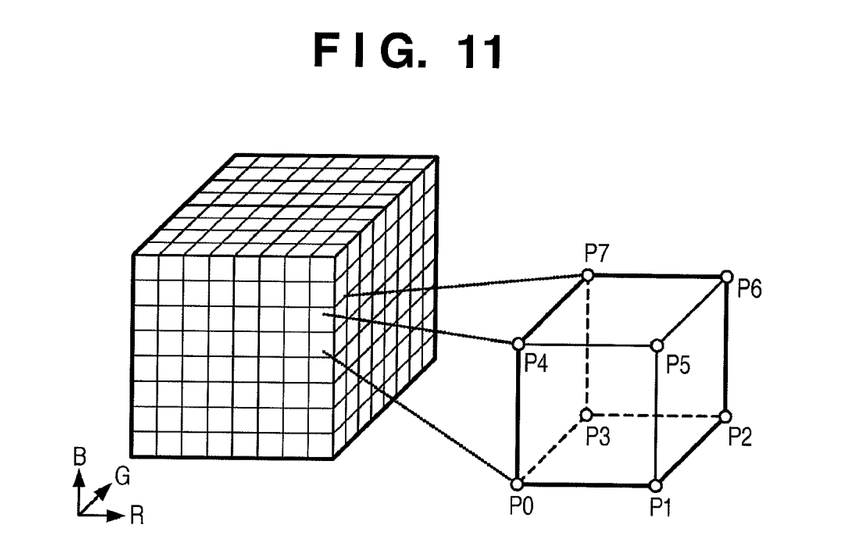
FIG. 11 is a view exemplifying the arrangement of lattice points in a color profile (3D-LUT)

After printing this chart, the printer 20 causes the color measurement unit 25 to measure the colors of all the patches of the chart, acquiring the L*a*b* values of all the patches. FIG. 10 exemplifies a state in which the acquired color measurement values are plotted in the L*a*b* space. FIG. 11 exemplifies a case in which the respective axes of the RGB space serving as an input color space are divided into nine (9×9×9), like a lattice. All 729 lattice points are expressed by combinations of discrete RGB values.

An example of a method of calculating CMYK values corresponding to all lattice points will be explained. A cube made up of lattice points P0 to P7 will be exemplified.

Figure 12:
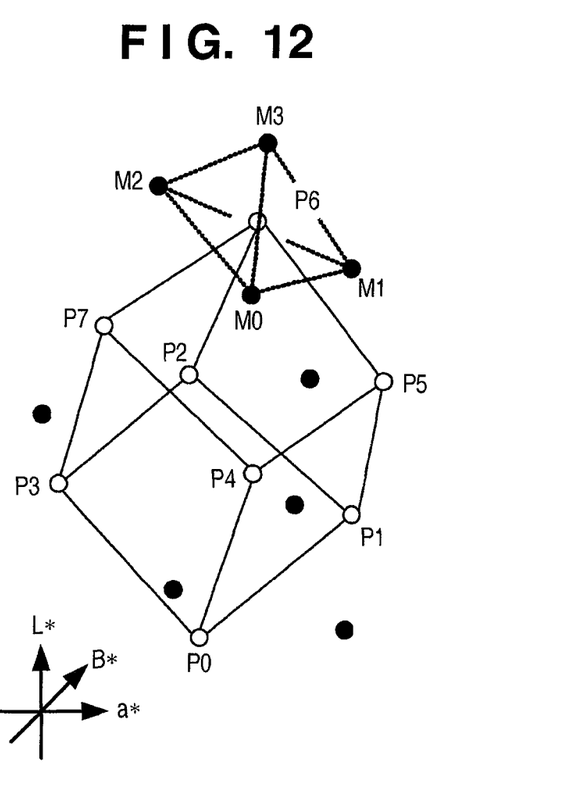
FIG. 12 is a view exemplifying the relationship between a lattice point and a measurement point in the color space when generating a color profile.
Figure 13:
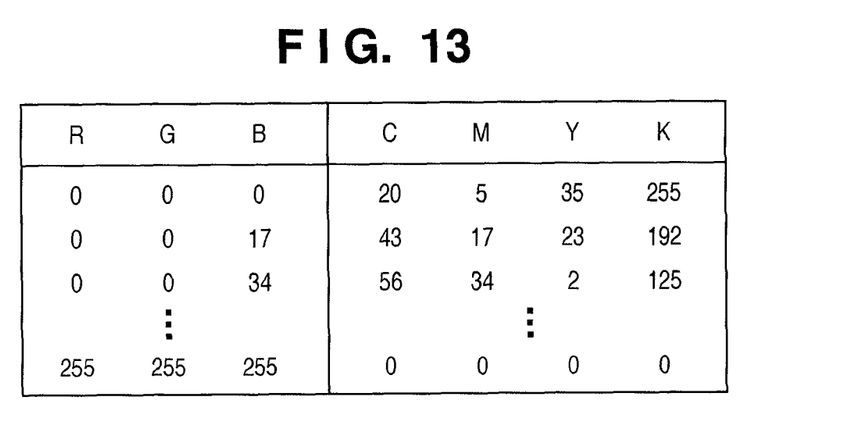
FIG. 13 is a table exemplifying data of a color profile for an RGB input and CMYK output.

RGB values are assigned to P0 to P7. An RGB value is converted into an L*a*b* value using a known calculation method. FIG. 12 shows an example of mapping the cube made up of P0 to P7 in the L*a*b* space. Black points in FIG. 12 represent the distribution of the color measurement values of C, M, Y, and K patches shown in FIG. 10.

Measurement points are distributed irregularly in the space. For example, when attention is paid to the lattice point P6, four measurement points M0, M1, M2, and M3 surrounding P6 can be specified. The lattice point P6 exists in a tetrahedron defined by these four measurement points. As for the vertices M0, M1, M2, and M3 of the tetrahedron, the correspondence between L*a*b* values and CMYK values is known. A CMYK value corresponding to the L*a*b* value of P6 is therefore calculated by interpolation. The calculated CMYK value is suitable for reproducing the tint of P6.

In this way, the CMYK values of all the lattice points P0 to P7 are obtained. This method is executed for all the lattice points in the RGB space shown in FIG. 11. Consequently, data representing the correspondence between RGB values and CMYK values shown in FIG. 13 can be acquired. This data is a color profile in the 3D-LUT form.

In subsequent printing, the color conversion unit 52 of the data processing unit 37 performs color conversion processing using this color profile. More specifically, the color conversion unit 52 converts the color from R, G, and B (first color space) into C, M, Y, and K (second color space) by using the color profile. The printer 20 can attain a printing result with a tint which should be reproduced.

After generating the color profile, characteristics in this state are desirably stored as target characteristics. For example, after printing the calibration chart shown in FIG. 6, it is measured to store the measurement results as target characteristics. The foregoing calibration processing may be executed before generating a color profile. In this case, when printing a profile generation chart, the processing described for the image data B 53 in FIG. 4 is done.

As described above, according to the first embodiment, it is determined based on the patch measurement result whether to perform generation of a profile, calibration processing, or neither of them. This can reduce the burden of determination on the user, shorten the time taken to keep the color reproduction of the printer 20 stable, and suppress the consumption amount of consumables (e.g., ink and printing media).

(Second Embodiment)

The second embodiment will be described. In the second embodiment, a color measurement unit 25 is formed from a spectrophotometer capable of measuring spectroscopic characteristics.

According to the second embodiment, in 5206 of FIG. 3 described in the first embodiment, whether a profile needs to be generated is determined in consideration of spectroscopic characteristics as well. Instead of comparing the color difference ΔE with the threshold α1, a comparison unit 32 compares a spectroscopic characteristic obtained by measuring the color of a determination patch with the target spectroscopic characteristic of a printer 20. The above-described determination is made based on whether ink maintains the same state as the previous one. More specifically, if it is determined as a result of the comparison that the ink state is the same as the previous one (NO in step S206), the process advances to determination of whether to execute calibration (i.e., shifts to S207). If it is determined that ink has changed owing to any cause (e.g., lot variations or deterioration) (YES in step S206), the process advances to profile generation processing (i.e., shifts to S212).

Figure 14:
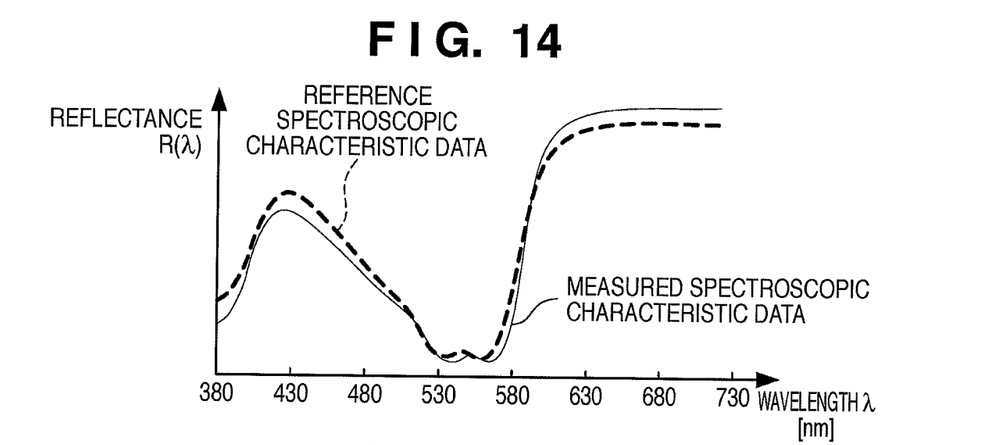
FIG. 14 is a graph exemplifying a reference spectroscopic characteristic and measured spectroscopic characteristic.
Figure 15:
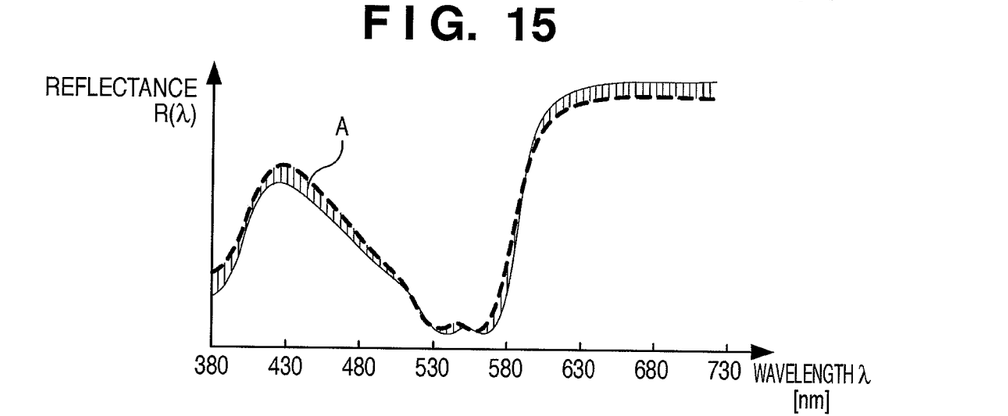
FIG. 15 is a graph exemplifying an area obtained by accumulating the absolute values of the differences between the reference spectroscopic characteristic and the measured spectroscopic characteristic at respective wavelengths.
Figure 16:
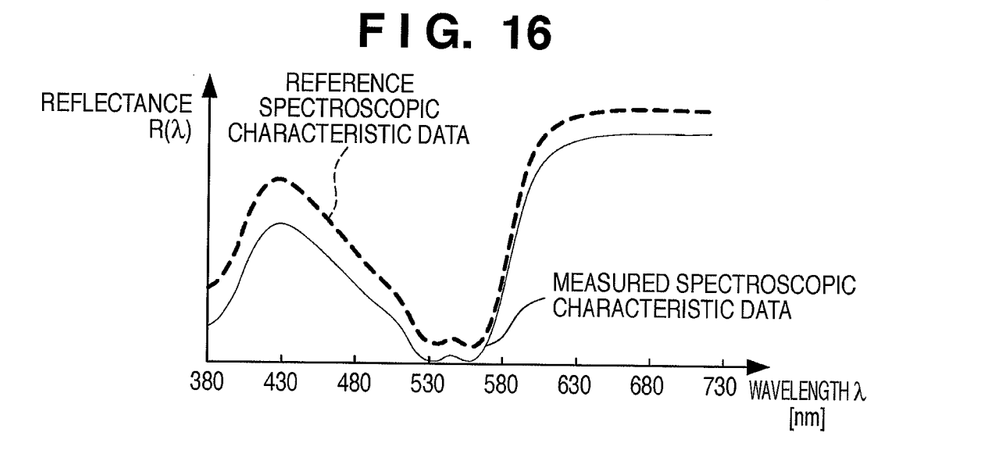
FIG. 16 is a graph exemplifying a reference spectroscopic characteristic and measured spectroscopic characteristic.

A concrete determination method for spectroscopic characteristics will be explained with reference to FIGS. 14 to 19. FIG. 14 exemplifies the spectroscopic characteristic of a magenta ink (M=50%). The abscissa represents the wavelength λ in a visible light region of 380 nm to 730 nm, and the ordinate represents the spectral reflectance R(λ) obtained by measuring a patch. In FIG. 14, a spectroscopic characteristic indicated by a broken line is a reference characteristic(target spectroscopic characteristics) stored in advance. A spectroscopic characteristic indicated by a solid line is measured spectroscopic characteristic data obtained by actually measuring the spectrum of a M (Magenta) patch in the determination chart of FIG. 5.

The absolute values of the differences between reference spectroscopic characteristic data and measured spectroscopic characteristic data are added for λ=380 nm to 730 nm. The sum is a value A corresponding to the area of a hatched portion shown in FIG. 15. The area A becomes small when the measured spectroscopic characteristic data is close to the reference spectroscopic characteristic, and large when it is greatly different. From this, if the area A is equal to or larger than a predetermined threshold α3 (third threshold), a PC 10 (correction processing determination unit 33) determines that the ink characteristic has greatly changed and a profile needs to be generated. If the area A is smaller than the threshold α3, the PC 10 (correction processing determination unit 33) determines that the ink characteristic has not changed and no profile need be generated. In this case, for example, the calibration processing is executed by the calibration processing unit 35.

For a pigment ink or the like, the whole density may vary due to precipitation in the ink tank or the like. In this case, the shape of the spectroscopic characteristic becomes analogous to that in FIG. 14, but the reflectance becomes high or low entirely, like a spectroscopic characteristic indicated by a solid line in FIG. 16. These variations can be corrected by adjusting the density or lightness, that is, by calibration processing using a 1D-LUT.

Although correction by calibration processing is possible, it may be determined that a profile needs to be generated. To prevent this, similarity transformation of the measured spectroscopic characteristic is performed to make the area of the measured spectroscopic characteristic equal to that of the reference spectroscopic characteristic. It is effective to perform the foregoing comparison after that. For example, the values R(λ) of the measured spectroscopic characteristic are accumulated within the range of λ=380 nm to 730 nm, obtaining an area Am. As for the reference spectroscopic characteristic, an area As is obtained, too. Each value R(λ) of the measured spectroscopic characteristic is multiplied by a ratio k=As/Am, and the product is set as a corrected measured spectroscopic characteristic. As shown in FIG. 14, the area of the measured spectroscopic characteristic becomes almost equal to that of the reference spectroscopic characteristic. In this state, the comparison is done, making a more accurate determination.

Figure 17:
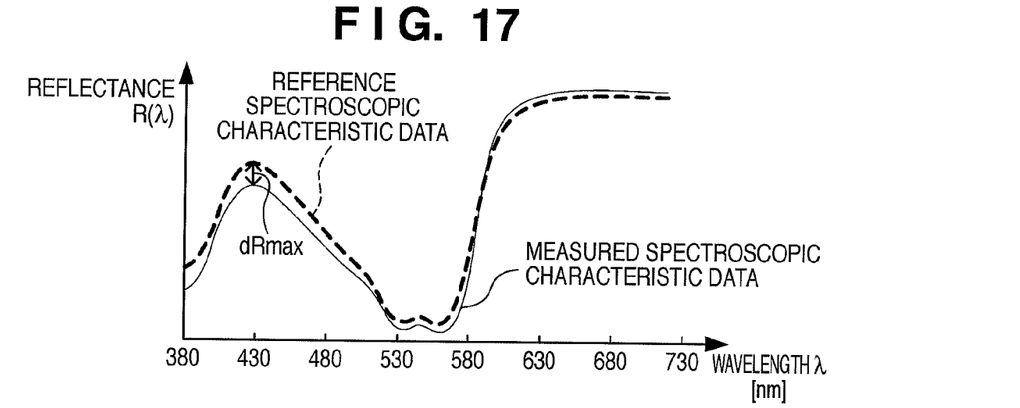
FIG. 17 is a graph showing an example of obtaining the maximum difference of the reflectance between the reference spectroscopic characteristic and the measured spectroscopic characteristic.

A modification when determining, based on the ink spectroscopic characteristic, whether to execute calibration and the like will be explained with reference to FIG. 17 (first modification). First, an absolute value dR(λ) of the difference between the reference spectroscopic characteristic and the measured spectroscopic characteristic is obtained at each wavelength within the range of the wavelength λ=380 nm to 730 nm. Then, a maximum value dRmax of dR(λ) is obtained. In the case of FIG. 17, a difference around 430 nm is dRmax. The maximum difference dRmax becomes small when the measured spectroscopic characteristic data is close to the reference spectroscopic characteristic, and large when it is greatly different. Thus, if the maximum difference dRmax is equal to or larger than a predetermined threshold α3, the PC 10 (correction processing determination unit 33) determines that the ink characteristic has greatly changed and a profile needs to be generated. If dRmax is smaller than the threshold α3, the ink characteristic has not changed and thus the PC 10 (correction processing determination unit 33) determines that no profile need be generated. Even in this determination method, a more accurate determination can be made by performing the above-mentioned area correction in advance. In this case, for example, the calibration processing is executed by the calibration processing unit 35.

Figure 18:
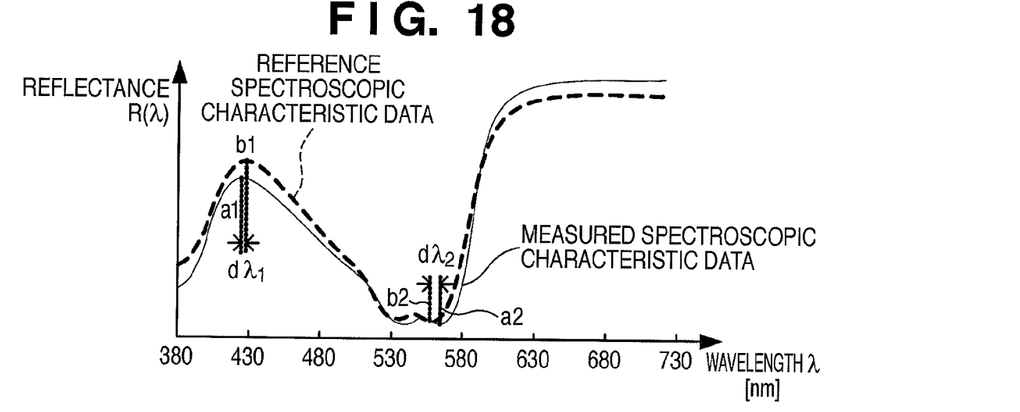
FIG. 18 is a graph showing an example of obtaining the wavelength difference at a feature point between the reference spectroscopic characteristic and the measured spectroscopic characteristic.

Another modification when determining, based on the ink spectroscopic characteristic, whether to execute calibration and the like will be explained with reference to FIG. 18 (second modification). First, feature points of the shape are extracted from the reference spectroscopic characteristic and measured one. For a magenta ink, it is known in advance that the vertex of a convex curve exists around 430 nm and that of a concave curve exists around 570 nm. Hence, data in these areas ±20 nm are checked to extract, as vertices, positions where the sign of the differential value is inverted. In the case of FIG. 18, a vertex a1 of the measured spectroscopic characteristic and a vertex b1 of the reference spectroscopic characteristic can be detected around 430 nm, and vertices a2 and b2 can be detected around 570 nm.

The absolute values of the wavelength differences between these vertices are obtained. dλ1 is calculated as the wavelength difference between a1 and b1, and d22 is calculated as that between a2 and b2. A maximum value dλmax out of these wavelength differences is compared with a threshold. In the case of FIG. 18, dλ2 is larger than cal, so dλmax=dλ2 and dλmax is compared with a predetermined threshold α3.

The wavelength difference dλmax becomes small when the measured spectroscopic characteristic data is close to the reference spectroscopic characteristic, and large when it is greatly different. From this, if the maximum difference dλmax is equal to or larger than the predetermined threshold α3, the PC 10 (correction processing determination unit 33) determines that the ink characteristic has greatly changed and a profile needs to be generated. If dλmax is smaller than the threshold α3, the PC 10 (correction processing determination unit 33) determines that the ink characteristic has not changed and no profile need be generated.

Figure 19:
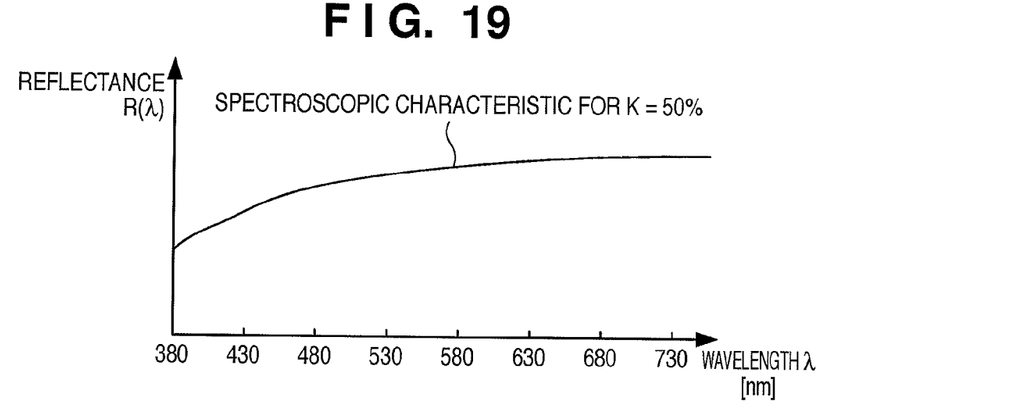
FIG. 19 is a graph exemplifying the spectroscopic characteristic of a black (K) ink.

In the determination method according to the second modification, determination is made based on a wavelength at a feature point, so the above-mentioned area correction need not be done in advance. This determination method is not effective for an ink having an almost flat spectroscopic characteristic, for example, a black ink having a spectroscopic characteristic as shown in FIG. 19. For such an ink, the two determination methods described above are considered to make a correct determination.

Typical embodiments of the present invention have been described above. However, the present invention is not limited to the aforementioned and illustrated embodiments, and can be properly modified without departing from the scope of the invention.

The present invention can adopt embodiments of a system, apparatus, method, program, storage medium, and the like. More specifically, the present invention is applicable to a system formed from a plurality of devices or an apparatus formed from one device.

According to the present invention, it is determined based on color measurement data whether to perform generation of a profile, calibration processing, or neither of them. This can reduce the burden of determination on the user.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-326582 filed on Dec. 22, 2008 and No. 2009-256547 filed on Nov. 09, 2009, which are hereby incorporated by reference herein in their entirety.

What is claimed is:

1. A data processing apparatus comprising:
    an obtaining unit configured to obtain a measurement result from a measurement of a color chart which is printed based on color chart data, and to obtain a target value corresponding to the color chart; and
    a determination unit configured to determine, based on the measurement result and the target value,
    (i) whether or not to execute profile generation processing for generating a color profile by measuring mixed color patches which are printed with printing materials of a plurality of colors; and
    (ii) whether or not to execute calibration processing by measuring single color patches which are printed with each of the printing materials of the plurality of colors,
    wherein the determination unit determines to execute the profile generation processing in a case where a color difference value between the measurement result and the target value is larger than a first value, determines to execute the calibration processing and not to execute the profile generation processing in a case where the color difference value is not larger than the first value and is larger than a second value smaller than the first value, and determines not to execute both the profile generation processing and the calibration processing in a case where the color difference value is smaller than the second value.

2. The data processing apparatus according to claim 1, further comprising a color measurement unit configured to measure the color chart.

3. The data processing apparatus according to claim 1, wherein
the color difference value is obtained by accumulating, for all wavelengths, absolute values of differences in reflectance at respective wavelengths between spectroscopic characteristics corresponding to the measurement result and spectroscopic characteristics corresponding to the target value.

4. The data processing apparatus according to claim 1, wherein
the color difference value is a maximum value among absolute values of differences in reflectance at respective wavelengths between spectroscopic characteristics corresponding to the measurement result and spectroscopic characteristics corresponding to the target value.

5. The data processing apparatus according to claim 1, wherein
the color difference value is a difference value between a wavelength at which reflectance indicate a maximum value at spectroscopic characteristics corresponding to the measurement result and a wavelength at which reflectance indicate a maximum value at spectroscopic characteristics corresponding to the target value.

6. The data processing apparatus according to claim 1, wherein the color profile is used for converting data in a first color space into data in a second color space.

7. The data processing apparatus according to claim 1, further comprising a generating unit configured to generate new color profile in a case where the determination unit determines to execute the profile generation processing, and to generate new calibration data in a case where the determination unit determines to execute the calibration processing.

8. The data processing apparatus according to claim 1, wherein
the obtaining unit obtains the measurement result and the target value, corresponding to each of a plurality of patches comprised in the color chart, and
the determination unit determines to execute the profile generation processing, in a case where at least one of color difference values respectively corresponding to the plurality of patches is equal to or larger than the first value.

9. The data processing apparatus according to claim 1, wherein the color difference value is a CIE-Lab value.

10. The data processing apparatus according to claim 7, wherein
the generating unit generates the new color profile in accordance with a measurement result of patches printed with printing materials corresponding to the plurality of colors, and generates the new calibration data in accordance with a measurement result of patches printed with printing material corresponding to one color of the plurality of colors.

11. The data processing apparatus according to claim 7, wherein
the color profile is used for converting RGB color data into CMYK color data, and
the calibration data is used for correcting the respective CMYK color data.

12. A data processing method, comprising:
obtaining a measurement result from measurement of a color chart which is printed based on color chart data, and obtaining target value corresponding to the color chart; and
determining, based on the measurement result and the target value,
(i) whether or not to execute profile generation processing for generating a color profile by measuring mixed color patches which are printed with printing materials of a plurality of colors; and
(ii) whether or not to execute calibration processing by measuring single color patches which are printed with each of the printing materials of the plurality of colors,
in the determining, it is determined to execute the profile generation processing in a case where a color difference value between the measurement result and the target value is larger than a first value, it is determined to execute the calibration processing and not to execute the profile generation processing in a case where the color difference value is not larger than the first value and is larger than a second value smaller than the first value, and it is determined to not to execute both the profile generation processing and the calibration processing in a case where the color difference value is smaller than the second value.

13. The data processing method according to claim 12, wherein the color profile is used file for converting data in a first color space into data in a second color space.

14. The data processing method according to claim 12, further comprising:
generating new color profile in a case where it is determined to execute the profile generation processing in the determining step, and new calibration data in a case where it is determined to execute the calibration processing in the determining step.

15. The data processing method according to claim 12, wherein,
in the obtaining step, the measurement result and the target value are obtained, corresponding to each of a plurality of patches comprised in the color chart, and
in the determining step, it is determined to execute the profile generation processing, in a case where at least one of color difference values respectively corresponding to the plurality of patches is equal to or larger than the first value.

16. A non-transitory computer-readable storage medium storing a computer program for causing a computer to function as:
an obtaining unit configured to obtain a measurement result from a measurement of a color chart which is printed based on color chart data, and to obtain a target value corresponding to the color chart; and
a determination unit configured to determine, based on the measurement result and the target value,
(i) whether or not to execute profile generation processing for generating a color profile by measuring mixed color patches which are printed with printing materials of a plurality of colors; and
(ii) whether or not to execute calibration processing by measuring single color patches which are printed with each of the printing materials of the plurality of colors,
wherein the determination unit determines to execute the profile generation processing in a case where a color difference value between the measurement result and the target value is larger than a first value, determines to execute the calibration processing and not to execute the profile generation processing in a case where the color difference value is not larger than the first value and is larger than a second value smaller than the first value, and determines not to execute both the profile generation processing and the calibration processing in a case where the color difference value is smaller than the second value.

\* \* \* \* \*